UNITED STATES PATENT OFFICE.

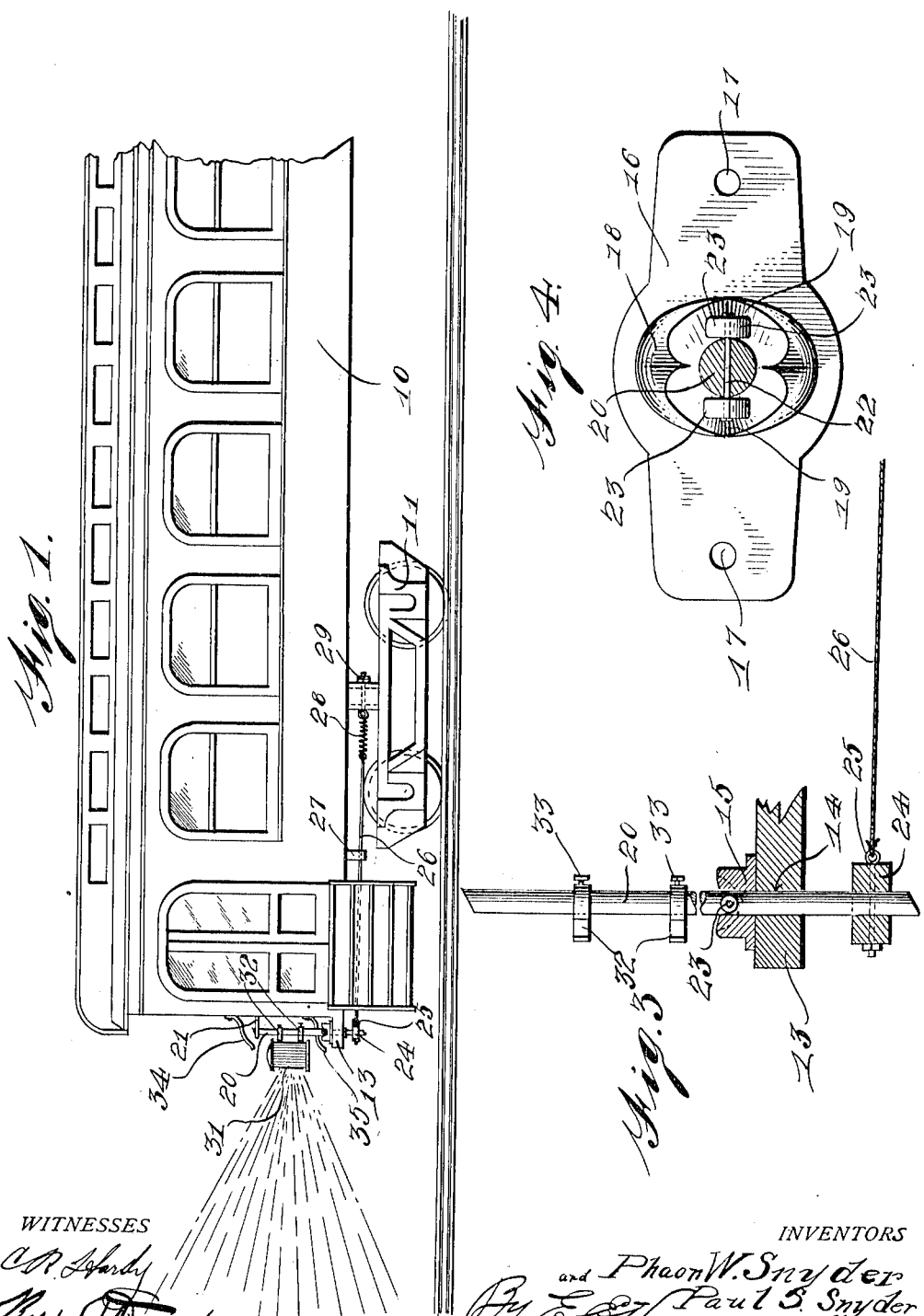

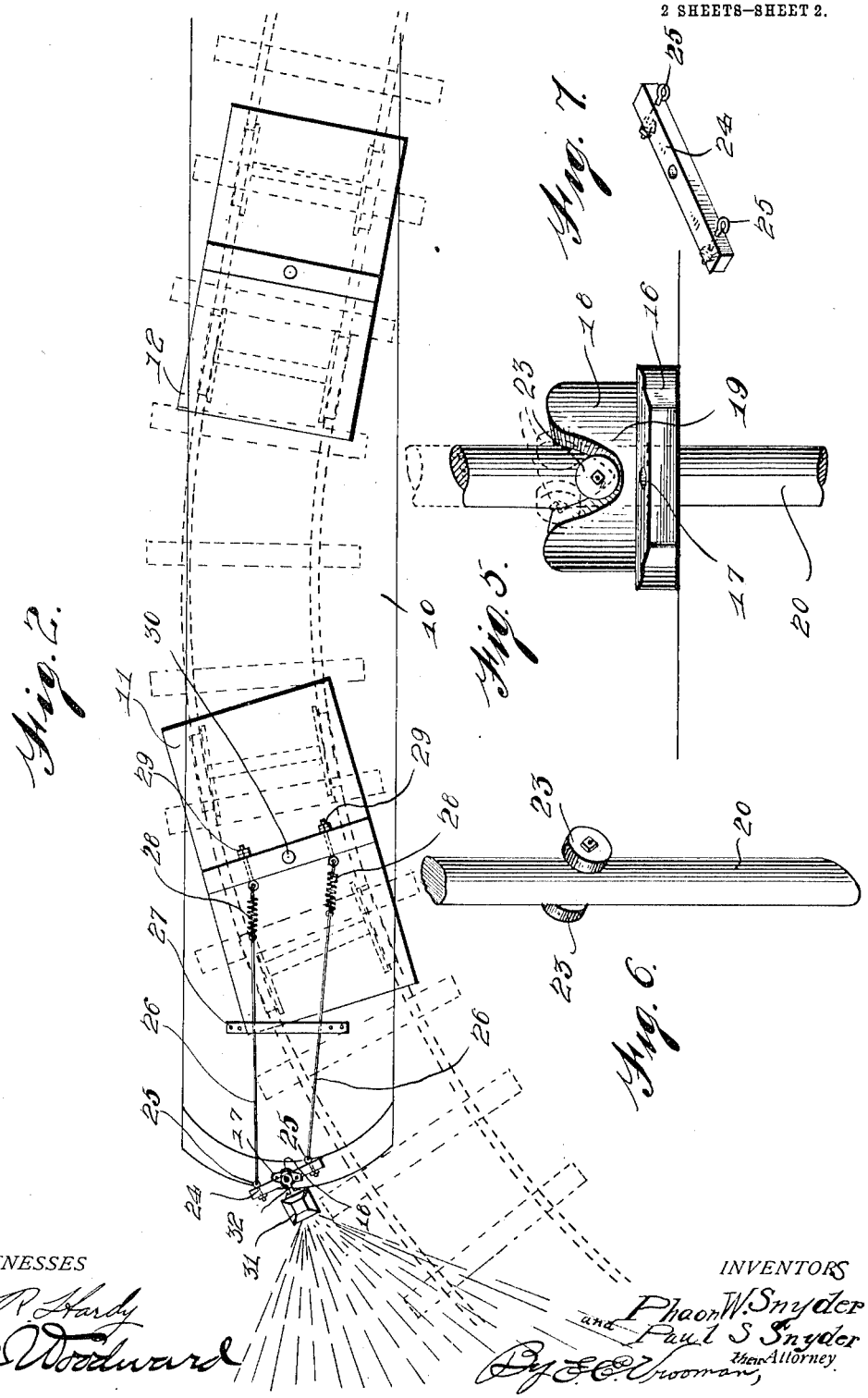

PHAON W. SNYDER AND PAUL S. SNYDER, OF WOOSTER, OHIO.

AUTOMATIC CURVE-SHOWING HEADLIGHT.

1,071,814.    Specification of Letters Patent.    Patented Sept. 2, 1913.

Application filed October 16, 1912. Serial No. 726,112.

*To all whom it may concern:*

Be it known that we, PHAON W. SNYDER and PAUL S. SNYDER, citizens of the United States, residing at Wooster, in the county of Wayne and State of Ohio, have invented certain new and useful Improvements in Automatic Curve-Showing Headlights, of which the following is a specification, reference being had therein to the accompanying drawing.

This invention relates to an attachment which is intended to be used in connection with a street car, locomotive or other vehicle, the attachment being a holder for the lamp and being so constructed that the lamp will be turned as the car tracks curve, thus turning the light in the direction in which the car is turning.

The principal object of the invention is to provide an improved means for mounting the shaft upon which the lamp is secured so that if the guiding lines should break the lamp will be held in a position to throw its light directly in front of the car and not to one side.

This device also prevents the lamp from being turned slightly from side to side as the truck shifts slightly between the rails. This is accomplished by providing an improved type of bearing through which the shaft passes, the shaft being provided with small rollers which rest in pockets formed in the side walls of the bearing, the sides of the pockets being sloped so that the small rollers must travel up hill when the lamp is turning, and will, therefore, normally stay in the bottom of the pocket thus holding the lamp in the desired position.

This invention is illustrated in the accompanying drawings, wherein:—

Figure 1 is a side elevation of a car provided with the improved lamp. Fig. 2 is a plan view showing the car turning a curve in the track and the lamp throwing its light in the direction in which the car is turning. Fig. 3 is a sectional view through the forward portion of the car with the lamp holding shaft in place. Fig. 4 is a top plan view of the bearing. Fig. 5 is a side elevation of the bearing. Fig. 6 is a perspective view of the lower portion of the lamp holding shaft. Fig. 7 is a perspective view of the cross bar which is secured to the lower end of the shaft.

This invention is used in connection with a car 10 provided with the forward and rear trucks 11 and 12. These trucks are of the usual construction so that it is not necessary to describe the construction of the trucks. A platform 13 extends from the forward end of the car and is provided with a vertically extending opening 14 so that the shaft which carries the lamp may pass through the platform. A bearing 15 is secured to the platform 13 with its central opening positioned in alinement with the opening 14.

From an inspection of Figs. 4 and 5 it will be seen that this bearing 15 comprises a base plate 16 which is provided with the openings 17 through which securing bolts may pass and a thickened central portion 18 having its side walls provided with oppositely disposed cut-out portions 19 forming pockets, the sides of which are sloped.

A vertical shaft 20 passes through the bearing 15 and has its upper end passing through a plate 21. A pin 22 passes transversely through the shaft 20 and rollers 23 are rotatably mounted upon the end portions of this pin. These rollers 23 are positioned in the pockets 19, and it will thus be seen that when the shaft 20 is turned that the rollers will travel up the inclined sides of the pocket. If the lines which operate the lamp should break while the lamp is in the turned position, the weight of the lamp and shaft will cause the shaft to be moved downwardly. After the car has completed the turn these rollers will prevent the shaft from accidentally turning. It should be noted that the sides of the pockets are of such length that when the lamp turns, the shaft will not turn a sufficient distance for the rollers to ride over the upper edges of the pockets and thus there is no danger of the lamp swinging in the wrong direction if the operating lines should break.

A bar 24 is rigidly secured to the lower end of the shaft 20 and is provided at its ends with eye-bolts 25 so that the guiding lines 26 may be connected with the bars 24. These lines 26 pass through openings formed in a bar 27 secured to the bottom of the car and have their inner ends connected with springs 28 which are carried by eye-bolts 29. These eye-bolts are carried by the truck 11 upon opposite sides of its pivot pin 30, and it will thus be seen that when the car turns a curve that the shaft 20 will be rotated thus turning the lamp in the direction in which the car is turning.

The lamp 31 is secured to brackets 32 which are adjustably mounted upon the shaft 20 and held in place by the set screws 33. Shielding plates 34 and 35 are carried by the car so that the operating means for the lamp will be protected from snow and ice.

From the above description it will be readily understood that when the lamp is mounted as shown in Figs. 1 and 2 that the lamp will turn when the car turns a curve and that the pockets and rollers will permit the shaft to be turned by the lines 26 when turning a curve, but if the lines become broken they will prevent the lamp from accidentally turning.

By adjusting the eye-bolts 25, the amount the lamp turns can be regulated. By this device the lamp is held steady so that it will not be moved by the trucks shifting between the tracks, and will be held to throw its light in front of the car if the guiding lines break.

Having thus described the invention, what is claimed as new, is:—

A device of the character described comprising a supporting platform, a plate mounted upon said platform, a socket formed upon said plate and provided with an opening positioned in alinement with an opening formed in said platform, the upper edge of said socket being provided with cut-out portions forming pockets, a shaft passing through said bearing and platform, a pin extending through said shaft, and rollers mounted upon the outer end portions of said pin and positioned in said pockets whereby said shaft will be normally prevented from rotating and will be returned to a normal position after being rotated.

In testimony whereof we hereunto affix our signatures in presence of two witnesses.

PHAON W. SNYDER.
PAUL S. SNYDER.

Witnesses:
W. HOWARD ROSS,
CHARLES A. WEISER.

Copies of this patent may be obtained for five cents each, by addressing the "Commissioner of Patents, Washington, D. C."